United States Patent Office 3,360,370

Patented Dec. 26, 1967

3,360,370

LEUCO DYE-AROMATIC BITRIAZOLE LIGHT-SENSITIVE DYE FORMER COMPOSITIONS

Charles Yembrick, Jr., Wilmington, Del., assignor to E. I. du Pont de Nemours and Company, Wilmington, Del., a corporation of Delaware No Drawing. Filed Apr. 29, 1964, Ser. No. 363,626
8 Claims. (Cl. 96—90)

ABSTRACT OF THE DISCLOSURE

A composition of (1) the leuco form of a dye having removable hydrogen and (2) an aromatic bitriazole. A representative composition is an aminotriarylmethane with 1,1'-bibenzotriazole. The composition can be irradiated with light of wavelengths between 2000–4200 A. whereupon the leuco dye is converted to its colored form.

This invention is directed to novel light-sensitive compositions and to a unique process for forming colored material from an essentially colorless one by irradiation with ultraviolet light. More particularly, the present invention deals with a composition comprising an intimate admixture of the leuco form of a dye and an aromatic bitriazole or quaternary derivative thereof as a photooxidant. Upon irradiation with a pattern of ultraviolet light the composition quickly undergoes a color change to form a clear image. The aromatic bitriazoles of this invention are bibenzotriazoles, binaphthotriazoles, and benzotriazolylnaphthotriazoles. When bibenzotriazoles are referred to as a general class in the specification, it will be understood that binaphthotriazoles and benzotriazolylnaphthotriazoles are included.

Image-forming compositions and processes play an essential part in photography, thermography, and related arts dealing with processes of writing, printing, and producing images with the aid of light, heat, electricity, or combinations of these activating influences. Currently available methods of image production impose numerous limitations which are costly, inconvenient, time-consuming, and sometimes potentially hazardous. Classical photography, for example, although efficient in employing light energy, uses expensive chemicals and papers, involves multi-step processing and drying, and requires a highly skilled operator for consistently good results.

Thermography requires less operator skill and less expensive papers than photography but produces less well-defined images which are easily destroyed. Mechanical printing, while inexpensive and rapid for repetitive copying, is decidedly more expensive and slow for sequential copying. In any event, mechanical printing yields a wet image. Presently available photochemical image-forming systems involve the use of toxic chemicals such as ammonia, cyanide derivatives, halohydrocarbons, and caustic materials. A new printing or imaging system which overcomes some of the limitations and difficulties of the existing systems would significantly advance the art and be desirable.

It is, therefore, an object of this invention to provide a new composition sensitive to ultraviolet light and capable of forming a permanent color when irradiated. Another object is to provide a composition which forms a permanent colored image when irradiated in a graphic pattern. A further object is to provide a photosensitive paper which can be imaged by irradiation with light in a graphic pattern. A still further object is to provide a novel process for forming colored material.

These and other objects are accomplished by the present invention described below.

More specifically, the present invention is directed to:

(1) a light-sensitive composition comprising an intimate admixture of (a) a dye in the leuco form represented by $DH_n$ the radical D represents a dye precursor and H represents a hydrogen atom, the removal of which forms a dye, D, differently colored than $DH_n$ and $n$ is one of the integers 1 and 2 and (b) an aromatic bitriazole which is a member of the group consisting of a compound having a structure represented by one of the formulas

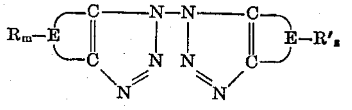

and

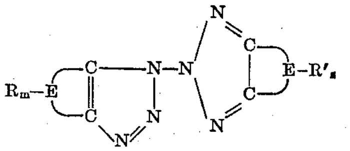

and a quaternary derivative thereof wherein E represents the elements needed to complete a benzo or naphtho ring; R and R' are the same or different members of the group consisting of hydrogen, Br, Cl, F, cyano, nitro, sulfo, sulfamoyl, $C_1$ to $C_{18}$ alkyl, $C_1$ to $C_{18}$ alkoxy, phenyl, and hydrocarbonylamido having 1 to 18 carbon atoms; and $m$ and $z$ are cardinal numbers 0 to 3; and said light-sensitive composition being activated to form color by light of a wavelength from about 2000 A. to about 4200 A;

(2) a light-sensitive product comprising a supporting base carrying a radiation-sensitive composition defined in (1);

(3) Paper treated with a composition defined in (1);

(4) A polymer matrix containing a composition defined in (1);

(5) A process for forming a colored material which comprises irradiating the light-sensitive composition of (1), (2), (3), or (4) with light having a wavelength from about 2000 A. to about 4200 A.; and (6) A composition as defined in (1) in which the leuco dye is tris(4-diethylamino-o-tolyl)methane zinc chloride-hydrochloride and the aromatic bitriazole is 1,1'-bibenzotriazole.

The leuco form of a dye which may compose the light-sensitive composition of the invention is the reduced form of the dye having one or two hydrogen atoms the removal of which together with one or two electrons produces the dye. Since the leuco form of the dye is essentially colorless, or in some instances it may be of a different color or of a less intense shade than the parent dye, it provides a means of producing an image when the leuco form is oxidized to the dye. This oxidation is accomplished in the invention by irradiation of an intimate admixture of the leuco form of the dye with a bibenzotriazole or quaternary derivative thereof with light in the ultraviolet range of wavelength from about 2000 A. to about 4200 A.

The exact mechanism of the photoxidation of the leuco dye in the presence of bibenzotriazole is perhaps not fully understood. The following mechanism, which we refer to as an acceptor mechanism, is proposed, but the invention gives the results stated whether or not this is the true theory involved. According to the acceptor mechanism the photooxidant serves as an "acceptor" of an electron ejected by the color generator to effect an irreversible color-forming reaction. Such a photooxidant generally absorbs none of the activating light. If it does absorb some of the activating radiation, the absorption is dissipated in a non-color-forming manner and does not lead to color generation. The activating radiation is, instead, absorbed by the color generator to produce a photo-excited molecule which then undergoes an oxidation-reduction reaction with the acceptor photo-oxidant. Thus, for a leuco dye molecule to be oxidized by the process of this invention, it must absorb some radiation in the ultraviolet range of wavelength from about 2000 A. to about 4200 A. to produce a photo-excited leuco dye molecule which then gives up an electron to the acceptor molecule which is the photooxidant.

When mixed with a bibenzotriazole, as defined hereinafter, a large number of dyes in the leuco form have been found to be readily converted to the parent dye by irradiation with ultraviolet light of wavelength from about 2000 A. to about 4200 A. by the above-described mechanism and are well adapted to provide new and useful image-forming compositions. Dyes in the leuco form which are operative according to the invention include:

(a) Aminotriarylmethanes, such as bis(4 - benzylethylaminophenyl)(2 - chlorophenyl) methane,
bis(4-dimethylaminophenyl) (4-dimethylamino-1-naphthyl)methane,
bis(p - dimethylaminophenyl)(1,3,3-trimethyl - 2 - indolinyl-idenemethyl)methane, and
bis(4-dipropylaminophenyl) (o-fluorophenyl)methane.

Because of their superior resistance to color development due to air oxidation, the preferred species of aminotriarylmethanes have either an alkyl group, an alkoxyl group or a halogen in the position ortho to the methane carbon in at least two of the aryl groups. Specific examples of these preferred species include:

bis(4-dimethylamino-o-tolyl)(2-chlorophenyl)methane,
bis(4 - diethylamino - 2 - methoxyphenyl)(4 - nitrophenyl)-methane,
tris(4-diethylamino-2-chlorophenyl)methane,
bis(4 - dimethylamino - o-tolyl)(2-bromophenylmethane),
bis(4 - diethylamino - o - tolyl)(4-benzylthiophenyl)-methane, and
bis(4-diethylamino-o-tolyl)(2-thienyl)methane.

(b) Aminoxanthenes, such as

3 - amino - 6 - dimethylamino - 2-methyl-9-(o-chlorophenyl)-xanthene,
3,6 - bis(diethylamino) - 9-(o-chlorophenyl)xanthene, and
3,6 - bis(dimethylamino) - 9 - (o - methoxycarbonylphenyl)-xanthene.

(c) Aminothioxanthenes, such as 3,6 - bis(dimethylamino) - 9 - (o - methoxycarbonylphenyl)-thioxanthene, and
3,6 - dianilino - 9 - (o-ethoxycarbonylphenyl)thioxanthene.

(d) Amino-9,10-dihydroacridines, such as 3,6 - bis(benzylamino)-9,10-dihydro-9-methylacridine, and
3,6-diamino-9-hexyl-9,10-dihydroacridine.

(e) Aminophenoxazines, such as

5 - benzylamino-9-diethylamino-benzo[a]phenoxazine, and
3,7-bis(diethylamino)phenoxazine.

(f) Aminophenothiazines, such as 3,7-bis(dimethylamino)-4-nitrophenothizaine,
3,7 - bis[N-ethyl-N-(m-sulfobenzyl)amino]phenothiazine monosodium salt, and
3,7-diaminophenothiazine.

(g) Aminodihydrophenazines, such as 3,7 - bis(benzylethylamino) - 5,10 - dihydro-5-phenylphenazine,
3,7 - bis(diamethylamine) - 5 - (p-chlorophenyl)-5,10-dihydrophenazine,
3,7-diamino-5,10-dihydro-5-methylphenazine, and
3,7-diamino-5,10-dihydro-2,5,8-trimethylphenazine.

(h) Aminodiphenylmethanes, such as 1,4-bis[bis-(p-diethylaminophenyl)methyl]piperazine,
bis(p-diethylaminophenyl)-1-benzotriazolylmethane,
bis(p - diethylaminophenyl)(2,4 - dichloroanilino)-methane,
bis(p-diethylaminophenyl)(octadecylamino)methane, and
1,1-bis(p-dimethylaminophenyl)ethane.

(i) Aminohydrocinnamic acids (cyanoethanes), such as

α-cyano-4-dimethylaminohydrocinnamamide,
α,β-dicyano-4-dimethylaminohydrocinnamamide,
α,β - dicyano - 4-(p-chloroanilino)hydrocinnamic acid, methyl ester,
p-(2,2-dicyanoethyl)-N,N-dimethylaniline, and
p-(1,2,2-tricyanoethyl)-N,N-dimethylaniline.

(j) Leucoindigoid dyes, such as 7,7′-diamino-5,5′-dichloroleucothioindigo,
6,6′-dichloro-4-methylleucothioindigo,
7,7′-dimethylleucoindigo,
5,5′-disulfoleucoindigo, disodium salt, and
5,5′,7,7′-tetrachloroleucoindigo.

(k) 1,4-diamino-2,3-dihydroanthraquinones, such as 1,4-bis(ethylamino)-2,3-dihydroanthraquinone,
1-amino-4-methoxyanilino-2,3-dihydroanthraquinone,
1,4-diamino-2,3-dihydroanthraquinone, and
1 - p - (2-hydroxyethylamino)anilino-4-methylamino-2,3-dihydroanthraquinone.

(l) 1,4-bis(4,5-diaryl-2-imidazolyl)benzenes, such as 1,4-bis(4,5-diphenyl-2-imidazolyl)benzene,
1,4 - bis[4,5 - bis(p - methoxyphenyl) - 2-imidazolyl]-benzene,
1,4 - bis[4,5 - bis(o - chlorophenyl) - 2 - imidazolyl]-benzene, and
1,4 - bis[4-(p-methoxyphenyl)-5-phenyl-2-imidazolyl]-benzene.

(m) Hydroxyphenyldiarylimidazoles, such as 2-(p-hydroxyphenyl)-4,5-diphenylimidazole,
2 - (3,5-dibromo-4-hydroxyphenyl)-4,5-diphenylimidazole,
2 - (3,5-dichloro-4-hydroxyphenyl)-4,5-diphenylimidazole,
2 - (4 - hydroxy - 3,5-dimethoxyphenyl)-4,5-diphenylimidazole,
2 - (3,5-dibromo-2-hydroxyphenyl)-4,5-diphenylimidazole,
4-(4-hydroxyphenyl)-2,5-diphenylimidazole, and
2 - (4 - hydroxy - 3,5 - dimethoxyphenyl) - 4,5 - bis(p-methoxyphenyl)-imidazole.

Of the above leuco forms of dyes, (*a*) through (*h*) form the dye by losing one hydrogen atom, while the leuco forms (*i*) through (*m*) lose two hydrogen atoms to produce the dye.

With the leuco form of dyes which have amino or substituted amino groups within the dye structure, a mineral acid, organic acid, or an acid from an acid-supplying compound is preferably employed to achieve highest optical density. The amount of acid may vary from 0.33 mole to 1.5 moles per mole of amino nitrogen in the dye. The preferred quantity of acid is about 1 mole per mole of amino nitrogen. Acid in large excess of that required to form a salt with the amino nitrogen should be avoided because it may render the composition less light-sensitive. Representative acids which form the required amino salts are hydrochloric, hydrobromic, sulfuric, nitric, phosphoric, acetic, oxalic, and p-toluenesulfonic. Other acids such as acids in the "Lewis" sense or acid sources which may be employed in the presence of water or moisture include zinc chloride, zinc bromide, ferric chloride, α,α,α-trichlorotoluene.

The aromatic bitriazoles of the light-sensitive compounds of this invention are bibenzotriazoles, binaphthotriazoles, and benzotriazolylnaphthotriazoles. They include compounds having a 1,1'- or 1,2'-linkage between the triazole groups. They may be substituted and/or quaternized. Representative compounds of this group adapted for use with the foregoing leuco dyes in photosensitive compositions include:

1,1'-bibenzotriazole
acetamido-1,1'-bibenzotriazole
benzamido-1,1'-bibenzotriazole
butyramido-1,1'-bibenzotriazole
cyclohexanecarboxamido-1,1'-bibenzotriazole
decanamido-1,1'-bibenzotriazole
4,4'-dibromo-1,1'-bibenzotriazole
4,4'-dibutoxy-1,1'-bibenzotriazole
5,5'-dichloro-1,1'-bibenzotriazole
6,6'-dichloro-5,5'-diethyl-1,1'-bibenzotriazole
5,5'-dicyano-1,1'-bibenzotriazole
5,5'-didecyloxy-1,1'-bibenzotriazole
4,4'-didodecyl-1,1'-bibenzotriazole
5,5'-difluoro-1,1'-bibenzotriazole
5,5'-diisopropyl-1,1'-bibenzotriazole
5,5'-dimethyl-1,1'-bibenzotriazole
dinitro-1,1'-bibenzotriazole
5,5'-dioctadecyl-1,1'-bibenzotriazole
5,5'-diphenyl-1,1'-bibenzotriazole
4,4'-disulfamoyl-1,1'-bibenzotriazole
5-hexenamido-1,1'-bibenzotriazole
mononitro-1,1'-bibenzotriazole
oleamido-1,1'-bibenzotriazole
stearamido-1,1'-bibenzotriazole
sulfo-1,1'-bibenzotriazole
5,5',6,6'-tetramethyl-1,1'-bibenzotriazole
4,4',5,5'-tetramethyl-6,6'-dichloro-1,1'-bibenzotriazole
1,1'-binaphtho[1,2-d]triazole
5,5'-dichloro-1,1'-binaphtho[1,2-d]triazole
5,5'-dimethoxy-1,1'-binaphtho[1,2-d]triazole
1,1'-bibenzotriazole, singly quaternized with dimethyl sulfate
1,1'-bibenzotriazole, singly quaternized with benzyl chloride
1,1'-bibenzotriazole, doubly quaternized with dimethyl sulfate
1,2'-bibenzotriazole
5-bromo-5'-chloro-4'-methyl-1,2'-bibenzotriazole
5'-bromo-5-fluoro-1,2'-bibenzotriazole
4'-chloro-1,2'-bibenzotriazole
5'-chloro-1,2'-bibenzotriazole
6'-chloro-7-ethyl-5'-methyl-1,2'-bibenzotriazole
5-chloro-4'-methyl-1,2'-bibenzotriazole
5-chloro-4',6'-dimethyl-1,2'-bibenzotriazole
tetranitro-1,2-bibenzotriazole
1,2'-binaphtho[1,2-d]triazole
2,3'-binaphtho[1,2-d]triazole
1-(naphtho[1,2-d]triazol-2-yl)naphtho[2,3-d]triazole
1-(naphtho[2,3-d]triazol-2-yl)naphtho[1,2-d]triazole
3-(naphtho[2,3-d]triazol-2-yl)naphtho[1,2-d]triazole
1-(benzotriazol-1-yl)naphtho[1,2-d]triazole
2-(5-chlorobenzotriazol-1-yl)naphtho[2,3-d]triazole
1,2'-bibenzotriazole, doubly quaternized with ethyl iodide
1,2'-binaphtho[1,2-d]triazole, singly quaternized with benzyl chloride
1-(benzotriazol-1-yl)naphtho[1,2-d]triazole, singly quaternized with methyl sulfate.

The 1,1'-bibenzotriazoles and derivatives are prepared by tetrazotizing with nitrous acid o,o'-diaminoazobenzene or its derivatives to bisdiazonium salts. The resultant salts are then reduced to the 1,1'-bibenzotriazole with sulfur dioxide. Derivatives bearing any of the designated and illustrated substituents are prepared from the correspondingly substituted o,o'-diaminoazobenzene. The 1,1'-binaphthotriazoles and 1-(benzotriazol-1-yl)naphthotriazoles are similarly prepared starting with azonaphthalene or a benzeneazonaphthalene having amino substituents in positions adjacent to the azo linkages.

1,2'-bibenzotriazole and benzo ring substituted 1,2'-bibenzotriazoles except those having a nitro substituent are prepared by reacting a solution of the benzotriazole in aqueous sodium hydroxide with hydroxylamino-O-sulfonic acid to form a corresponding 2-aminobenzotriazole which is separated from its isomers by fractional crystallization. The 2-aminobenzotriazole is then mixed with an o-halonitrobenzene such as o-chloronitrobenzene and heated to 160° to 205° C. for 5 hours in the presence of anhydrous sodium acetate to produce 2-(o-nitrophenylamino)benzotriazole. The product is isolated by filtration and recrystallized from such a solvent as ethanol. The 2-(o-nitrophenylamino)benzotriazole is catalytically reduced with hydrogen to 2-(o-aminophenylamino)benzotriazole. The 2-(o-aminophenylamino)benzotriazole is diazotized in the usual way with nitrous acid to convert the primary amine to a diazonium salt which couples with the secondary amino group to form a triazole ring and yield a 1,2'-bibenzotriazole.

The nitro derivatives cannot be prepared by this procedure because the reduction step converts to primary amine any nitro group in addition to that contributed by the o-chloronitrobenzene. This leads to loss of the nitro group and to complication in the subsequent diazotization step. Nitro derivatives of 1,2'-bibenzotriazole are produced by treatment of the bibenzotriazole with nitric acid.

Similarly, 1,2'-binaphthotriazoles are prepared by first reacting a napththotriazole with hydroxylamino-O-sulfonic acid and condensing the intermediate 2-amino-naphthotriazole with a chloronitronaphthalene having the chloro and nitro groups on adjacent carbon atoms. To prepare benzotriazolylnaphthotriazoles having a 1,2-linkage o-chloronitrobenzene is reacted with 2-aminonaphthotriazole.

The above aromatic bitriazoles are quaternized singly or doubly, i.e. one or two quaternary groups are formed within the triazole rings, by heating the bitriazole with a quaternizing compound. Suitable quaternizing compounds are dimethyl sulfate, benzyl chloride, ethyl iodide, methyl iodide, triethyl phosphate, methyl p-toluenesulfonate, and the like.

Solvents which are inert toward the leuco form of the dye and the bibenzotriazole are usually employed to dissolve these components and thereby mix them together and to provide a fluid medium for a convenient and ready application of the light-sensitive composition to substrates. It is preferable to have at least 0.5% by weight of the solvent retained by such a substrate as paper to ensure optimum image formation upon radiation with ultraviolet light. It is not necessary that the substrate be wet with solvent, humidified, or specially handled. In general, a preferred solvent has a boiling point of at least 60° C. at atmospheric pressure. Solvents with high boiling points that are not readily removed by evaporation may be used when their quantity is restricted as it can be in mixtures with other solvents having relatively high vapor pressures.

Representative solvents which may be employed are formamide, N,N-dimethylformamide, N,N-dimethylacetamide, hexanamide, stearamide, acetone, methanol, ethanol, 1-propanol, 2-propanol, butanol, ethylene glycol, polyethylene glycols, ethyl acetate, ethyl benzoate, benzene, o-dichlorobenzene, toluene, dimethylsulfoxide, pyridine, tetrahydrofuran, dioxane, and mixtures of these solvents in various proportions as may be required to attain solution of the leuco dye and the bibenzotriazole selected for use in the photosensitive composition.

In addition to a residual amount of a solvent, a polymeric binder or matrix may be present in the light-sensitive composition spread over or contained in a substrate. A binder which may optionally be added to the composition is an inert material that serves to adhere the photosensitive mixture to the substrate. The binder may also serve to thicken the solution of the composition should this be desirable for specific applications. The light-sensitive composition may also be mixed with a polymeric material which can serve as a matrix for the photosensitive composition and the mixture may be cast, extruded or otherwise formed into unsupported films. These films may then be used for image formation or as are the substrates bearing the light-sensitive mixture of leuco dye and bibenzotriazole photooxidant.

Examples of binders and matrices that will be found applicable are ethyl cellulose, polyvinyl alcohol, polyvinyl chloride, polystyrene, polyvinyl acetate, poly-(methylmethacrylate), cellulose acetate, cellulose nitrate, chlorinated rubber, copolymers of vinyl monomers, gelatin. Amounts within the range of about 0.5 part to 10 parts will be used when the polymer functions as an adhesive or thickener, while higher amounts will be used when the polymer forms an unsupported film containing the photosensitive composition. With certain polymer matrices, the addition of a plasticizer may be desirable to give flexibility to the film or coating containing the photosensitive composition.

The substrates are materials to which the present novel light-sensitive, image-forming compositions, may be applied as a coating or impregnant. They are materials commonly used in the graphic arts and in decorative and protective applications. These materials include paper varying in type from tissue paper to heavy cardboard; films of plastics and polymeric materials such as regenerated cellulose, cellulose acetate, cellulose nitrate, polyesters of glycol and terephthalic acid, polyethylene, polyvinyl acetate, poly(methylmethacrylate) and the like; textile fabrics; glass; wood and metals.

A procedure for preparing the composition of this invention is to make a solution of the leuco dye ranging in concentration from about 0.5% by weight to the limit of its solubility in the selected solvent or solvent mixture and to add to this solution a bibenzotriazole in an amount about equivalent on a molar basis to the leuco dye. Optionally, a binder as described above may be added to the solution. The selection of the leuco dye will depend upon the color and quality of the image desired. Two or more leuco dyes may be used in combination to obtain a particular color or shade of color or to provide a neutral gray or black coloration in the image.

In applying a solution of the photosensitive composition to paper, films, fabric, or to surfaces of rigid substrates such as glass, wood, plastics, or metals the solution may be sprayed, brushed, applied by a roller or an immersion coater, flowed over the surface, picked up by immersion, or spread by other means. Complete coverage of the substrate may be attained or a pattern of the light-sensitive composition may be printed on the substrate. In impregnating paper, for instance, such concentrations of solution and pick-up by the paper are made so as to provide from about 0.01 mg./in.$^2$ to about 5.0 mg./in.$^2$ of leuco dye and the equivalent amount of bibenzotriazole electron acceptor. Images of greater and lesser intensity of color are provided by the application of greater and lesser amounts of leuco dye to the substrate.

The substrates bearing the solution of the leuco dye and bibenzotriazole, and optionally a binder, may be dried simply at room temperature. They also may be dried under vacuum at room temperature or at elevated temperatures. The upper temperature limit is critical in combination with exposure time. A short exposure to heat of 90° C. may not be detectably harmful, while several hours' exposure to this heat may reduce the light sensitivity composition.

The leuco dye and the bibenzotriazole utilized in the practice of this invention may be mixed in mole ratios within the range from about 10:1 (leuco dye:bibenzotriazole) to about 1:10. The preferred range is 2:1 to 1:2, while the preferred ratio is about 1:1.

Any convenient source of ultraviolet light of wavelength that is absorbed in part by the leuco dye of the photosensitive composition of the invention may be used to activate the composition and induce the formation of an image. Among the light sources which have been employed are a sun lamp, an electronic flash gun, a germicidal lamp, ultraviolet lamps providing specifically light of short wavelength (2537 A.) and lamps providing light of long wavelength (3663 A.). The light exposure time will vary from a fraction of a second to several minutes depending upon the intensity of the light, its distance from the light-sensitive composition, the nature and amount of the light-sensitive composition, and the intensity of color in the image desired. In general, light sources that emit radiation in the region between about 2000 A. and about 4200 A. are useful in producing color in solutions of the leuco dye-bibenzotriazole compositions and images with these compositions on numerous substrates.

Images may be formed by a beam of light or by exposure to light of a selected area behind a negative, a stencil, or relatively opaque pattern. The negative may also be one in which the opacity results from aggregations of areas of different refractive index. Image formation may also be effected in conventional diazo printing apparatus.

The novel light-sensitive compositions of the present invention, as herein described, are significantly useful in a variety of applications such as:

(1) *Printing applications*

Very soft paper, as for example, tissue paper, can be easily imaged when it has been treated with the subject photosensitive composition, by projecting an image onto the treated surface.

(2) *Radiation dosimeters*

Paper or plastic film may be impregnated or coated with the subject photosensitive compositions and these may be used to determine the quantity of solar radiation that falls on a particular surface.

(3) *Layout for metal working*

The photosensitive composition may be applied to a metal surface when suitably formulated as a paint or lacquer. The metal surface may then be marked by irradiation through a suitable template to produce an image. The image may correspond to holes which are to be drilled or other operations of metal working and manufacture. This technique is particularly valuable when the metal to be marked has an irregular shape.

(4) *Blueprints*

When applied to paper or plastic films, the light-sensitive compositions of this invention can find application in diazo printout equipment.

Representative examples further illustrating the present invention follow:

EXAMPLE 1

In one part of N,N-dimethylformamide is dissolved 0.005 part of 1,1′-bibenzotriazole and 0.005 part of tris-(4-diethylamino-o-tolyl)methane zinc chloride-hydrochloride salt. A portion of solution is used to saturate a piece of filter paper, and the paper is dried in air at room temperature in the dark. A section of the paper is then exposed to light from a 275-watt sun lamp at a distance of 4 inches for 10 seconds. The exposed area of the paper develops an intense blue color while the unirradiated part remains colorless. Paper similarly impregnated with the leuco dye alone, i.e. not mixed with the bibenzotriazole, remains essentially colorless under these exposure conditions.

The same intense blue color develops in other portions of the paper bearing the leuco dye and 1,1′-bibenzotriazole upon exposure for about two milliseconds to the light from a xenon flash tube having a light output of 5000 candle power seconds. Also, the blue color is obtained when the treated paper is exposed for 20 seconds to the light of ultraviolet lamps fitted with filters to allow transmission of light essentially at wavelengtss of 2537 A. and 3660 A., respectively.

A portion of the solution containing the leuco dye and 1,1′-bibenzotriazole is then placed under the sun lamp. In five seconds a pale blue color appears. In one minute the color is dark blue produced by the formation of tris-(4-diethylamino-o-tolyl)methane dye which is identified by its absorption spectrum. In the absence of the 1,1′-bibenzotriazole, no photooxidation of the leuco dye solution, as indicated by blue color formation, occurs on exposure to the sun lamp for five seconds. After one minute of exposure to the sun lamp, the leuco dye solution develops a trace of color.

By the above procedure, a solution of 1,1′-bibenzotriazole with tris(p-diethylaminophenyl)methane in place of tris(4-diethylamino-o-tolyl)methane zinc chloride-hydrochloride salt employed to impregnate filter paper produces an intense purple color upon irradiation with ultraviolet light from the various sources. The coloration results from the photooxidation of the leuco dye to the dye itself by the 1,1′-bibenzotriazole under the action of the ultra-violet light.

Similarly, other mixtures of leuco dyes and a bibenbotriazole or derivative thereof is applied to paper and color obtained upon exposure to ultraviolet light. In the absence of the bibenzotriazole, the paper remains essentially colorless. Irradiation through a stencil produces a well defined image. The particular leuco dyes and bibenzotriazoles employed in the mixtures and the color produced upon irradiation with ultraviolet light are listed in Table I.

dimethoxyphenyl) - 4,5 - bis(p-methoxyphenyl)imidazole shows only a very weak absorption of light at 445 mμ wavelength after 30 flashes of the ultraviolet light tube. The absorption under these conditions is in marked contrast to the much stronger absorption one obtains in the presence of the 1,2′-bibenzotriazole.

EXAMPLE 12

*Preparation of quaternary derivatives*

A mixture of five parts by weight of 1,1′-bibenzotriazole and 67 parts by weight of dimethyl sulfate is heated at 95° C. for 20 minutes. The reaction mass is then cooled and filtered to remove unreacted 1,1′-bibenzotriazole. The filtrate is mixed with 215 parts by weight of ethyl ether whereupon a crystalline reaction product is precipitated and then isolated and air-dried. There is obtained a 72% yield of singly quaternized 1,1′-bibenzotriazole which is identified by elemental analysis.

When the above starting mixture is heated at a temperature between 95° and 110° C. for two hours, a reaction product which is insoluble in the dimethyl sulfate forms. This is separated by filtration, washed with ether, and dried. There is obtained an 85% yield of doubly quaternized 1,1′-bibenzotriazole identified by elemental analysis.

Each of the above quaternary derivatives having a methosulfate anion is converted to the corresponding iodide by stirring in an aqueous solution of sodium iodide. Elemental analysis of the precipitated quaternary ammonium iodide confirms the preparation of the respective singly and doubly quaternized products.

The preceding representative examples may be varied within the scope of the present total specification disclosure, as understood and practiced, by one skilled in the art, to achieve essentially the same results.

As many apparently widely different embodiments of this invention may be made without departing from the spirit and scope thereof, it is to be understood that this invention is not limited to the specific embodiments thereof.

TABLE I

| Ex. | Leuco Dye | Bibenzotriazole | Photooxidation Product | Color |
|---|---|---|---|---|
| 2 | 1,2,2-tricyano-1-(p-dimethylaminophenyl) ethane. | 1,1′-bibenzotriazole | Corresponding ethylene | Red-orange. |
| 3 | As Example 2 | Dinitro-1,1′-bibenzotriazole | As example 2 | Do. |
| 4 | Tris(4-diethylamino-o-tolyl)methane | 1,1′-bibenzotriazole, singly quaternized with dimethyl sulfate. | Corresponding methane dye | Blue. |
| 5 | As Example 2 | 1,1′-bibenzotriazole, singly quaternized with methyl iodide. | As Example 2 | Red-orange. |
| 6 | As Example 4 | 1,1′-bibenzotriazole, doubly quaternized with dimethyl sulfate. | As Example 4 | Blue. |
| 7 | As Example 2 | 1,2′-bibenzotriazole | As Example 2 | Red-orange. |
| 8 | As Example 4 | do | As Example 4 | Blue. |
| 9 | Tris (p-diethylaminophenyl)methane | do | Corresponding methane dye | Purple. |
| 10 | 1,4-bis(4,5-diphenyl-2-imidazolyl)benzene | do | 2,2′-(2,5-cyclohexadien-1,4-diylidene)bis-(4,5-diphenylimidazole). | Blue. |

EXAMPLE 11

In 50 ml. of acetone is dissolved 22 mg. of 2-(4-hydroxy-3,5-dimethoxyphenyl)-4,5-bis(p - methoxyphenyl)-imidazole and 6 mg. of 1,2′-bibenzotriazole. A portion of the solution in a one ml. quartz cell absorbs no light in the visible range as observed in a spectrophotometer. The quartz cell and its contents are then exposed to successive flashes of ultraviolet light from a xenon flash tube. The visible light absorption is again determined at intervals after one to 30 flashes. The solution becomes orange with a progressive deepening of the color as the number of ultraviolet light exposures is increased, and confirmed by a progressive increase in the intensity of the light absorption with a maximum at the 445 mμ band of the spectrum. In the absence of the 1,2′-bibenzotriazole, a solution of the same concentration of 2-(4-hydroxy-3,5-

The embodiments of the invention in which an exclusive property or privilege is claimed are defined as follows:

1. A light-sensitive composition comprising an intimate admixture of (a) the leuco form of a dye having one or two removable hydrogen atoms, the removal of which forms a differently colored compound, and (b) an aromatic bitriazole which is a member of the group consisting of a compound having a structure represented by one of the formulas

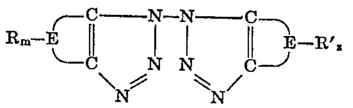

and

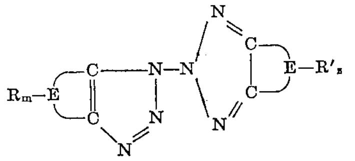

and a quaternary derivative thereof wherein E represents the elements needed to complete a ring selected from the group consisting of benzo and naphtho rings; R and R′ are selected from members of the group consisting of hydrogen, Br, Cl, F, cyano, nitro, sulfo, sulfamyl $C_1$ to $C_{18}$ alkyl, $C_1$ to $C_{18}$ alkoxy, phenyl, and hydrocarbonylamido having 1 to 18 carbon atoms; wherein R and R′ may be the same or different; and *m* and *z* are cardinal numbers 0 to 3; said light-sensitive composition being capable of activation to form color by light of a wavelength from about 2000 A. to about 4200 A.

2. A light-sensitive product comprising a supporting base carrying a light-sensitive composition as defined in claim 1.

3. Paper treated with a light-sensitive composition as defined in claim 1.

4. A polymer matrix containing a light-sensitive composition as defined in claim 1.

5. A composition according to claim 1 wherein said (a) is tris(4-diethylamino-o-tolyl)methane zinc chloride-hydrochloride and said (b) is 1,1′-bibenzotriazole.

6. A process for forming a colored material which comprises irradiating the light-sensitive composition of claim 1 with light having a wavelength from about 2000 A. to about 4200 A.

7. The composition of claim 1 wherein the leuco form of the dye of component (1) is selected from the class consisting of an aminotriarylmethane, an aminoxanthene, an aminothioxanthene, an amino-9,10-dihydroacridine, an aminophenoxazine, an aminophenothiazine, an aminodihydrophenazine, an aminodiphenylmethane, an aminohydrocinnamic acid, a leuco-indigoid dye, a 1,4-diamino-2,3-dihydroanthraquinone, a 1,4-bis(4,5-diaryl-2-imidazolyl)-benzene, and a hydroxyphenyl-diarylimidazole.

8. The composition of claim 1 wherein the leuco form of the dye of component (1) is selected from the class consisting of (a) an aminotriarylmethane containing at least two p-dialkylaminosubstituted phenyl groups having as a substituent ortho to the methane carbon an alkyl, alkoxy or halogen,
(b) salts thereof formed with mineral acids,
(c) salts thereof formed with organic acids, and
(d) salts thereof formed with an acid-supplying compound.

References Cited

UNITED STATES PATENTS 3,284,205 11/1966 Sprague et al. ---------- 96—90

OTHER REFERENCES

Carroll, B. H.: "The Photochemical Oxidation of Leuco-Bases," J. Physical Chem., vol. 30, No. 1, pp. 130–133 (1926).

NORMAN G. TORCHIN, *Primary Examiner.*

C. E. DAVIS, *Assistant Examiner.*

UNITED STATES PATENT OFFICE
CERTIFICATE OF CORRECTION

Patent No. 3,360,370 December 26, 1967

Charles Yembrick, Jr.

It is certified that error appears in the above identified patent and that said Letters Patent are hereby corrected as shown below:

Column 11, line 13, "sulfamyl" should read -- sulfamoyl, --.

Signed and sealed this 29th day of July 1969.

(SEAL)
Attest:

Edward M. Fletcher, Jr.
Attesting Officer

WILLIAM E. SCHUYLER, JR.
Commissioner of Patents